(12) United States Patent
Phinney

(10) Patent No.: US 6,299,663 B1
(45) Date of Patent: *Oct. 9, 2001

(54) GRANULATION METHOD AND APPARATUS THEREFOR

(75) Inventor: Robin Phinney, Calgary (CA)

(73) Assignee: Airborne Industrial Minerals Inc., Calgary (CA)

(*) Notice: Subject to any disclaimer, the term of this patent is extended or adjusted under 35 U.S.C. 154(b) by 0 days.

This patent is subject to a terminal disclaimer.

(21) Appl. No.: 09/075,214

(22) Filed: May 11, 1998

Related U.S. Application Data (63) Continuation-in-part of application No. 08/966,530, filed on Nov. 10, 1997, now Pat. No. 6,013,209, which is a continuation of application No. 08/636,751, filed on Apr. 19, 1996, now abandoned.

(51) Int. Cl.[7] .............. A01N 25/00; C05B 7/00; C05D 1/00
(52) U.S. Cl. ............ 71/64.13; 71/64.03; 71/63; 71/61; 71/59; 71/34
(58) Field of Search ............ 23/313 R, 313 P; 71/57, 64.03, 64.05, 34, 59, 56, 63, 64.13

(56) References Cited

U.S. PATENT DOCUMENTS

| | | | |
|---|---|---|---|
| H001070 | 7/1992 | Harrison et al. | 23/313 |
| 2,741,545 | 4/1956 | Nielsson | 71/28 |
| 3,206,528 | 9/1965 | Coombs et al. | 264/117 |
| 3,423,171 | 1/1969 | Hoppe et al. | 23/121 |
| 3,429,657 | 2/1969 | George et al. | 23/63 |
| 3,436,175 | 4/1969 | Atwood et al. | 23/119 |
| 3,528,767 | 9/1970 | Garrett | 23/89 |
| 3,533,776 | 10/1970 | Coates et al. | 71/28 |
| 3,536,475 | 10/1970 | Trub | 75/3 |
| 3,539,326 | 11/1970 | Otsuka et al. | 71/28 |
| 3,578,399 | 5/1971 | Boeglin | 23/121 |
| 3,617,243 | 11/1971 | Neitzel | 71/63 |
| 3,635,691 | 1/1972 | Earl . | |
| 3,656,891 | 4/1972 | Chemtob | 23/59 |

(List continued on next page.)

FOREIGN PATENT DOCUMENTS

| | | | |
|---|---|---|---|
| 2151569 | 12/1996 | (CA) | B01J/2/30 |
| 0 289 074 A1 | 11/1988 | (EP) | C05C/13/00 |
| 0 748 651 A1 | 12/1996 | (EP) | B01J/2/14 |
| 1383110 | 2/1975 | (GB) | C07C/126/08 |
| WO 97/39826 | 10/1997 | (WO) | B01J/2/14 |

OTHER PUBLICATIONS

"Advanced Fertilizer and Industrial Mineral Technology", Solterra Minerals Inc.

Primary Examiner—Stephen P. Griffin
Assistant Examiner—Eileen E. Nave
(74) Attorney, Agent, or Firm—Paul S. Sharpe; Mark & Clerk (57) ABSTRACT

Granulated particles by making use an initial feedstock having particle size of −150 mesh and 90% or greater particle size of 200 mesh. The feedstock may be contacted in a pan granulator which includes a minor amount of nucleating material of about −35 mesh. Binder is introduced into the pan granulator to progressively layer the feedstock material onto the nucleating to form a final granular fertilizer or other product in any desired size distribution. The method by which the granules are formed is interruptible and is particularly useful for forming granules having a plurality of layers of differing material. The granules, by formation with dust feedstock and in the absence of seed material, lack a core and therefore include the maximum amount of tightly packed feedstock. This results in substantial increases in the break strength of the granules with uniform homogeneous cross-sections. Such granules overcome the limitations associated with existing granules to provide an industrially valuable product.

4 Claims, 6 Drawing Sheets

U.S. PATENT DOCUMENTS

| | | |
|---|---|---|
| 3,687,639 | 8/1972 | Barlow et al. ............................ 23/300 |
| 3,711,254 | 1/1973 | McGowan et al.. .................... 23/313 |
| 3,728,438 | 4/1973 | Nasyrov ................................ 423/551 |
| 3,785,796 | 1/1974 | Mann, Jr. . |
| 3,808,051 | 4/1974 | Schoenholz et al. ..................... 134/2 |
| 3,843,772 | 10/1974 | Boeglin ................................ 423/551 |
| 3,853,490 | 12/1974 | Boeglin et al. ......................... 23/313 |
| 3,928,015 | 12/1975 | Siegel et al. .............................. 71/28 |
| 3,967,930 | 7/1976 | Sadan .................................... 23/296 |
| 3,983,211 | 9/1976 | Nasyrov et al. ..................... 423/128 |
| 3,984,521 | 10/1976 | Nasyrov et al. ..................... 423/120 |
| 3,998,935 | 12/1976 | Adams et al. ....................... 423/552 |
| 4,045,543 | 8/1977 | Sardisco .............................. 423/482 |
| 4,116,848 | 9/1978 | Schoenholz et al. ................. 252/90 |
| 4,129,642 | 12/1978 | Neitzel ................................ 423/199 |
| 4,131,668 | 12/1978 | Sasaki et al. ........................ 264/40.4 |
| 4,142,885 | 3/1979 | Heumann et al. . |
| 4,174,382 | 11/1979 | Menche ................................ 423/552 |
| 4,175,943 | 11/1979 | Jordaan et al. .......................... 71/29 |
| 4,183,738 | 1/1980 | Carmon .................................... 71/50 |
| 4,215,100 | 7/1980 | Sokolov et al. ..................... 423/552 |
| 4,264,543 | 4/1981 | Valenta ................................ 264/37 |
| 4,268,492 | 5/1981 | Sardisco et al. ..................... 423/482 |
| 4,303,619 | 12/1981 | Kobayashi et al. ................. 422/205 |
| 4,323,386 | 4/1982 | Heggebo et al. ........................ 71/35 |
| 4,330,319 | 5/1982 | Bexton et al. . |
| 4,334,906 | 6/1982 | Young .................................... 71/33 |
| 4,342,737 | 8/1982 | Iwashita et al. ..................... 423/522 |
| 4,344,747 | 8/1982 | Henry .................................... 425/140 |
| 4,371,481 | 2/1983 | Pollock ................................ 264/15 |
| 4,371,512 | 2/1983 | Sardisco et al. ..................... 423/551 |
| 4,385,920 | 5/1983 | Dancy et al. ............................ 71/36 |
| 4,420,468 | 12/1983 | Yamashita et al. ................. 423/482 |
| 4,436,710 | 3/1984 | Miyazaki et al. ..................... 423/552 |
| 4,451,439 | 5/1984 | Maurel et al. .......................... 423/55 |
| 4,528,039 | 7/1985 | Rubin et al. ............................... 134/2 |
| 4,533,536 | 8/1985 | Bichara et al. ....................... 425/551 |
| 4,554,004 | 11/1985 | Bierman et al. ........................ 71/29 |
| 4,554,151 | 11/1985 | Worthington et al. ............... 423/551 |
| 4,562,058 | 12/1985 | Dancy et al. ........................ 423/551 |
| 4,588,573 | 5/1986 | Worthington et al. ............... 423/552 |
| 4,589,904 | 5/1986 | Harrison et al. . |
| 4,610,715 | 9/1986 | Monaldi et al. .......................... 71/28 |
| 4,668,242 | 5/1987 | Vitellaro et al. ...................... 23/313 |
| 4,707,347 | 11/1987 | Vajna et al. .......................... 423/552 |
| 4,943,308 | 7/1990 | Vanmarcke et al. . |
| 5,108,481 | 4/1992 | Shutt ....................................... 71/61 |
| 5,112,379 | 5/1992 | Young . |
| 5,124,104 | 6/1992 | Holley ................................. 264/113 |
| 5,152,821 | 10/1992 | Walter . |
| 5,177,008 | 1/1993 | Kampen ............................... 435/139 |
| 5,177,009 | 1/1993 | Kampen ............................... 435/139 |
| 5,298,050 | 3/1994 | McLaughlin et al. ................... 71/63 |
| 5,322,532 | 6/1994 | Kurtz ...................................... 51/293 |
| 5,330,552 | 7/1994 | Rizzo ....................................... 71/30 |
| 5,366,534 | 11/1994 | Fischbein et al. ....................... 71/63 |
| 5,378,259 | 1/1995 | Bassetti et al. . |
| 5,383,951 | 1/1995 | Cross et al. . |
| 5,460,765 | 10/1995 | Derdall et al. ....................... 264/117 |
| 5,529,764 | 6/1996 | Lampert et al. ..................... 423/552 |
| 5,549,876 | 8/1996 | Zisner et al. ......................... 423/199 |
| 5,552,126 | 9/1996 | Efraim et al. ........................ 423/199 |
| 5,571,303 | 11/1996 | Bexton . |
| 5,624,649 | 4/1997 | Gal ................................. 423/243.11 |
| 6,132,484 | * 10/2000 | Phinney .................................. 71/31 |

* cited by examiner

GRANULATION METHOD AND APPARATUS THEREFOR

This application is a continuation-in-part application of U.S. Ser. No. 08/966,530 filed Nov. 10, 1997 now U.S. Pat. No. 6,013,209 which application is a continuation of U.S. Ser. No. 08/636,751, filed Apr. 19, 1996 now abandoned.

FIELD OF THE INVENTION

The present invention is directed to a series of products formed by a pan granulation method for forming granules and more particularly, the present invention is directed to an improved fertilizer granule as well as additional granules.

BACKGROUND OF THE INVENTION

Generally speaking, pan granulation has been proposed in the art many times previously and with significant variations.

One of the latest issued patents in the art to which the present invention relates is U.S. Pat. No. 5,460,765, issued to Derdall et al., Oct. 24, 1995. The reference teaches a process for pan granulating a particulate material. Based on the teachings of the Derdall et al. reference, a final particle size distribution that is achievable by practicing the invention is between about −5 mesh to about +10 mesh. In order to initiate the process, the Derdall et al. process is limited to the introduction of a seeding material typically between about −14 mesh and +28 mesh. This is required in order to control the granule growth and as indicated in the Derdall et al. disclosure, seed minimizes mutual agglomeration and results in high yields being obtained. The Derdall et al. reference further indicates that the proper sizing of the seed is fundamental to the operation of the process for granulation in order to have product yields exceed 90%. Reference is made in the disclosure that a seed core in the range of −14 mesh to +35 mesh is required in order to achieve a steady state and maintain uniform size distribution of between −8 mesh to +6 mesh.

One of the greatest limitations existing in the granulation art is centered on the fact that known processes require a seeding agent in order to achieve the proper conditions for material accretion to result in a pellet or granule. By making use of a seed, the resulting granule is adversely affected in two key properties; roundness and cross-sectional uniformity. Typically, seeding material is not round and as the precursor particle, the result is irregular initial feedstock accretion which, in turn, forms an out-of-round particle upon which further material accretes. A further detriment from this results in terms of nonuniform particle density.

Methodology is required for synthesizing a granule in the absence of seed material and which is round, tightly packed with a uniform homogeneous cross-section and capable of eliminating hazards associated with fertilizer granule production.

The Derdall et al. process, although a meritorious procedure, did not recognize the limitations of employing a seeding agent or the need for controlling the dust generated during granulation which not only creates an unhealthy environment for workers, but more seriously, results in a potentially explosive environment. This is evident from the teachings of Derdall et al., particularly at column 3, beginning at line 24, wherein it is stated:

"It may be more difficult to keep the granulation steady or stable with fine seed, such as −35 mesh."

The difficulty to which the Derdall et al. disclosure alludes is directed to cycling which is an inherent problem with pan granulation processes. If the size distribution of the seeding agent is not constant, then the process will not stabilize and effectively "cycles" as is known to those skilled in this art. The result of this is that larger formed granules on the pan effectively destroy the smaller particles. This, of course, defeats the purpose of the pan granulation to generate particles.

Furthermore, at line 36 in column 3, the disclosure indicates that:

"Fine seed sizes can be used, such as +35 mesh, but a point is reached where over-seeding or nucleation occurs easily and causes the final product yield to drop down."

It is also indicated at column 3, beginning at line 45 that:

"Seed material in the range of 20 mesh is the best single point for each of control and uniformity of product size distribution . . . "

As is known, the larger the mesh numerical value the smaller the micron size of the respond to the stated micron sizes:

| Mesh Size | Approximate Micron Size |
|---|---|
| 12 | 1680 |
| 16 | 1190 |
| 20 | 840 |
| 30 | 590 |
| 40 | 420 |
| 100 | 149 |
| 200 | 74 |

Based on the teachings of the Derdall et al. disclosure, mesh sizes greater than +35 cause potential nucleation problems and result in a final product yield to decrease. With the technology disclosed infra, it has been found that by using a fine powder of between −35 mesh to +150 mesh, that a superior quality product can be formed in a high yield and typically in the range of greater than 90% yield. When the above passage regarding Derdall et al. is considered, it is clear that Derdall et al. effectively contradict what the technology set forth herein has found to be particularly successful.

In the present application the size distribution of the nucleating material is between −35 mesh and +150 mesh which corresponds to micron size less than 590 μm and 105 μm, respectively. Nowhere in the prior is a powdered nucleating agent in this size distribution disclosed for purpose of forming a uniform granule in the size distribution of, for example, 3 mesh to about 10 mesh. Advantages have been ascribed to this process and one of the most attracttive advantages is that the granule or pellet has an enormous break strenght and a uniform cross-section, It has been found by practicing the present invention, that break strenghts in the range of 1 to 4 kg or greater have been achieved.

In the Derdall et al. disclosure, at column 3, beginning at line 33 it is stated:

"Seed of large size forms granules of very poor strength."

If one considers these teachings in light of the size of the nucleating agent provided herein, the admissions made in the Derdall et al. disclosure would clearly go against the appeal of using a seeding agent in the size range as clearly taught by Derdall et al. The instruction in Derdall et al. indicates an ideal seeding agent size is 20 mesh (supra); the instant application uses a powder having a particle size between 75–750% smaller than Derdall et al. and yet achieve very desirable results.

In Statutory Invention Registration H1070, authored by Harrison et al., Jul. 7, 1992, a method for granulating potash materials is disclosed. The process involves the conversion of particulate potassium sulfate or potassium chloride by agglomeration using a conventional rotary drum granulator, pan granulator or other conventional granulating device.

In the disclosure of this document, there are no specific teachings regarding the elimination of a seeding agent, feedstock size or other important factors related to process control in order to generate superior quality granules having commercial viability. Further, the process clearly is an agglomeration process. It is known that agglomeration typically involves the aggregation of colloidal particles suspended in a liquid into clusters or flocs. These clusters or flocs have varying degrees of interstice and are loosely bound (Hawley's Condensed Chemical Dictionary, eleventh edition, 1987).

It would be desirable if it were possible to achieve a high yield granular product within specified mesh sizes which does not require the use of a seed in the process.

The present invention is directed to satisfying the limitations in the art and more particularly those limitations in the Derdall et al. reference.

SUMMARY OF THE INVENTION

One object of the present invention is to provide a granulated homogeneous fertilizer product having a uniform cross-section devoid of a seeding agent and having a break strength of at least two kilograms in a size distribution of 3 mesh to 10 mesh.

A further object of the present invention is to provide a granule made in accordance with a method comprising the steps of:

providing an initial feedstock having a uniform size distribution of about 99.9% particle size of −150 mesh and of said 99.9% particle size of −150 mesh about 90% comprising a particle size of −200 mesh;

providing a nucleating material in a size distribution of 35 mesh to 150 mesh;

providing a binder solution;

contacting the binder and the feedstock in a pan granulator; and forming fertilizer granules directly in the pan granulator in the absence of a seeding agent.

Advantageously, it has been found that the granulation process can be achieved in the absence of any seed material to result in a high yield product with high break strength in a single pan granulator.

As an alternative the product may be formed in a two-stage method where an intermediate sized granule can be produced that is predominantly −8 mesh to +20 mesh in a first stage. This product can then be dried and screened such that the −8 to +20 portion of granules is used as a feed to the second stage.

In the second stage, the −8 to +20 mesh portion may be added to a second stage granulator pan where suitable binder is added to grow the small balls into uniform sized +8 to −4 mesh granules or balls which are then dried in a dryer.

The so-dried product may be then screened on −8 to +4 mesh to produce a new product in the form of a premium granular fertilizer, for example, break strength of greater than 1.0 kilograms (kg) with 3 to 4 kilograms (kg) being typical. The −8 to +20 mesh portion leaving the dryer may be recovered and recycled to the second stage pan. The +4 mesh and the −20 mesh portions may be sent to a suitable pulverizer for recycling.

It has been found that the nucleation center in the size range of −35 mesh to +150 mesh may be employed as a basis for granule growth and further, that the nucleation center may comprise any suitable material known to those skilled in the art. As is known from prior art granules, the presence of a core, i.e. a seed significantly affects the quality of the final product. Since the seed is relatively large (14 mesh), such materials are often irregularly shaped which, in turn, leads to irregular feedstock accretion. This leaves the final product aspherical, loosely packed and with an irregular nonuniform cross-sectional appearance.

By making use of a nucleating material which is a dust relative to the core arrangements in the prior art, the above limitations are circumvented. This feature has dramatic consequences in terms of cost savings as well as providing the user with the capacity to "shell" or "onion-skin" nucleation center with additional materials which may be similar or different from one another. This degree of freedom is obviously favorable, since multiple component homogenous granules can be readily produced. As an example, and without being limiting, the process is applicable to granule formation where the granule includes a base fertilizer material which may be surrounded by a coating having limited solubility in order that the fertilizer be a time release type compound. As a further example, the process is particularly well suited to the formation of novel water softener balls or granules for use in water softening systems. Additionally, specialty fertilizer grades may be easily formed using the process according to the present invention. Utility for the process can be realized for a plethora of particle types.

As a further option, the process has applicability in other fields such as the preparation of ice melt product. As an example, for the formation of the sodium chloride granules, the process, according to one embodiment of the invention, permits the addition of Mg or CaCl2 to the sodium chloride to enhance the ice melt characteristics and make a more efficient ice melt product. It will be appreciated by those skilled in the art that a host of additional examples may be achievable depending on the particular end use.

In accordance with the further desirable features of the present invention, the provision of a plurality of pan granulators permits full control and customization of the granule characteristics. By using one or a plurality of pan granulators when the process steps are observed, the result is that the granule can be uniformly grown under stabilized conditions without continual cycling as is the limitation in the prior art where only a single pan is disclosed for use. By employing the process parameters and apparatus according to the present invention, progressive accretion of the material on the granule is possible to result in a high density packed pellet with extremely high break strength, solid, uniform cross-section and a user predetermined size.

Significant additional advantages can be realized by the technology set forth herein including:

i) an enhanced market value of the formed product;

ii) the formation of a more user friendly product;

iii) significantly improved product handleability;

iv) a significantly improved uniformity index:

v) no product loss or waste.

vi) uniform cross-section;

vii) tightly packed feedstock;

viii) absence of a seed or crystal core;

ix) increased break strength relative to the prior art;

x) material homogeneity throughout the granule; and xi) greater quantity of feedstock material per granule The process and apparatus contribute to achieve a greater than 90% recovery of product which is on specification (spec) in the desired size range. Of the remaining 10% of the product, the same may be simply reintroduced into the pulverizer to create fines for reintroduction into the system. Accordingly, it will be readily apparent to those skilled that the process may be not only particularly useful for the user but further, results in monetary and energy savings from 100% use of the product.

In view of the elegance of the technology set forth herein, the result is that the apparatus and method may be applied in a retrofit application to existing systems which cannot achieve the level of efficiency attributed to the present technology set forth in the present case; existing systems may be significantly improved by simply adding the apparatus of the present invention and the method disclosed herein to improve such systems. This is a further advantage of the present invention in that the method is interruptible and does not require any specific parameters in terms of temperature, etc. in order to operate efficiently. In this manner, the pan granulators, employed in the present invention, may be arranged in any number of ways, i.e. in series, parallel, towered, etc., and may include any number of compounds to apply any number of layers on a granule as the same is grown through the system.

Having thus described the invention, reference will now be made to the accompanying drawing illustrating preferred embodiments.

BRIEF DESCRIPTION OF THE DRAWINGS

Similar numerals in the drawing denote similar elements.

DETAILED DESCRIPTION OF THE PREFERRED EMBODIMENTS

Figure 1:
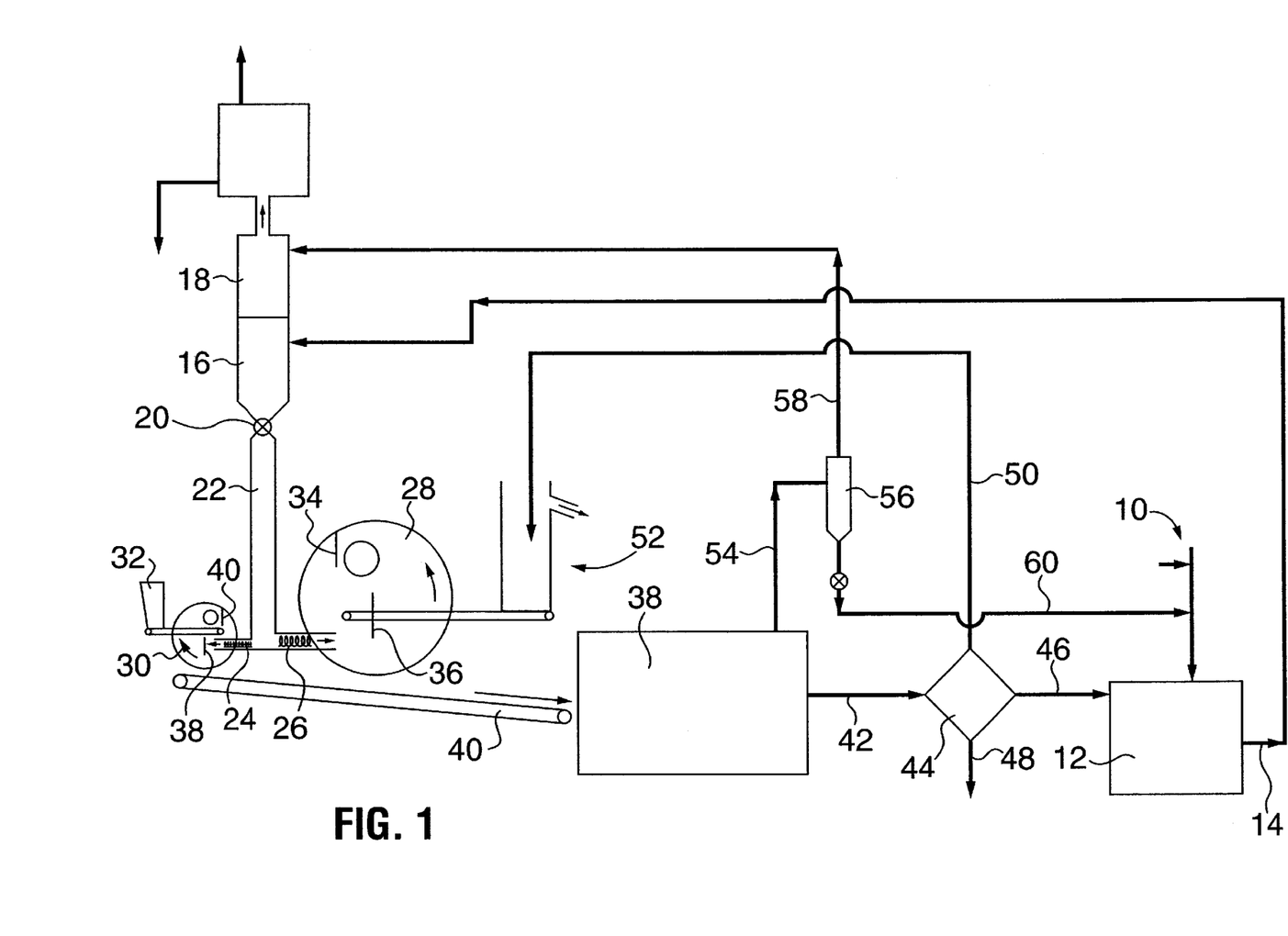
FIG. 1 illustrates a schematic representation of the method according to one embodiment of the present invention.

Referring now to FIG. 1, shown is an overall schematic representation of the process according to one embodiment.

In the embodiment shown, the circuit is representative of a ten ton per hour circuit. Reference numeral 10 denotes the introduction of feedstock which may be any suitable material, numerous examples of which have been indicated supra. The technology set forth herein permits the formation of most any granulated product including various sulfates, soda ash, sulfur, potash, kaolin, magnesia, potassium sodium and ammonium chloride inter alia.

The feed may be introduced at 9.8 tons per hour (9.8 thr-1) along with suitable binder material as set forth herein previously. The feedstock and binder may be then introduced into a pulverizer 12 to pulverize the feedstock such that a product is produced having 99.9% –150 mesh and at least 90% –200 mesh. The pulverizer 12 may be a classifying pulverizer or air sweep pulverizer or any other suitable pulverizer known by those skilled in the art. Once pulverized, the stream, generally represented by numeral 14, is introduced into a sealed collection hopper, globally denoted by numeral 16, which includes a bag house 18 to collect dust. Collection hopper 16 includes suitable valve 20 for metering dust into a collection bin 22. The bin 22 is mounted over two feeders 24 and 26 which divide the material being received from bin 22 into two streams, the first stream being fed by feeder 26 to a first large pan granulator 28 at a rate of 7.6 tons per hour (7.6 thr-1), as an example, while feeder 24 feeds a second stream into a second pan granulator 30, being smaller than pan granulator 28. The feed rate to the small pan may be 2.8 tons per hour (2.8 thr-1), as an example, to be consistent with the ten ton per hour circuitry.

Pan 30 is equipped with a small receptacle 32 for retaining –35 mesh dry raw feedstock (not shown). The receptacle 32 is equipped with a variable rate metering apparatus (not shown). The feeder removes the material from the receptacle 32 and introduces the dry raw feedstock into pan 30. As is known in the art, the pan granulators 28 and 30 include upper and lower scrapers 34, 36 and 38, 40, respectively. Regarding the feedstock from receptacle 32, the same is introduced to the pan 30 behind top scraper 38. In this example, the production rate for the pan 30 would be set for 3 tons per hour (3 thr-1) with a size distribution of approximately 80% product between –8 mesh to +20 mesh. It has been found that this is achievable by combining the raw feedstock to the dust at a ratio of 1:20 to 1:100 parts. The use of an atomizing hot binder solution at any position from the 12 o'clock through to the 5 o'clock position has been found to be particularly useful. When the correct free moisture is attained, generally between 1.5% to about 11%, the first pan stabilizes at a steady state condition. In this manner, granules are formed directly on pan 30 in the absence of a seeding agent.

As indicated above, the product formed from pan 30 is typically between 50 to 80% –8 mesh. The product is discharged and dried with dryer 39. Dryer 39 may be selected from, for example, Carrier dryers, tray dryers or roto louver type dryers. The product being formed in large pan 28 is additionally transported to dryer 39 via a suitable conveyer, globally denoted by numeral 41.

Product exiting dryer 39 via stream 42 is then screened by a suitable screening arrangement 44 at 4 mesh, 8 mesh and 20 mesh. The +4 and –20 mesh portions are sent to pulverizer 12 for recycling into the system, the recycling stream being indicated by numeral 46. The –4 to +8 mesh portion is the final product and leaves screen 44, as indicated by numeral 48, as a final finished product. The –8 to +20 mesh portion is sent via stream 50 to a hopper equipped with a weigh belt feeder, broadly denoted by numeral 52. The material is advanced from the weigh belt feeder 52 into pan 28 whereupon the product is further processed by the introduction of binder and additional dust to produce a desired granule product.

Any residual dust which may be present in dryer 39 may be passed via line 54 for exiting dryer 39 to hopper 56 and the collected material in hopper 56 either passed onto the bag house 18 via line 58 or passed into the feedstock via line 60. The fines or dust entering bag house 18 may additionally be passed off onto ancillary operations, for example, wet scrubbing, as broadly denoted by numeral 60 in FIG. 1. Other examples will be readily apparent to those skilled in the art.

The ratio of −8 to +20 mesh product needed to run pan 28 at a steady state has been found to be, for the system described herein, between 1:10 to 2:5, an optimum of 1:5. Pan 28 stabilizes quickly and produces yields of greater than 95% on +8 to −4 mesh. The process yield from the overall circuit as set forth herein exceeds 90%. As discussed briefly herein previously, 10% of the weight, which is in the −20 and +4 mesh size distribution, as well as dryer dusts, can be recycled to enhance the efficiency and productivity of the method to produce maximum yields at very low cost.

With further reference to the pans 28 and 30, as is known, the pans may be adjusted for angle and rotational speed such that the +8 to −4 mesh granules are only produced. In addition, it has been found advantageous to not only change the horizontal disposition of the pans, but also to laterally tilt the pans to enhance the efficiency of the granulating process. The specific angle of tilt and horizontal angle will be dependent upon the rotational speed and the size of the granule desired to be produced.

It will be appreciated that the method for operation as discussed can be a single operation or may be incorporated into a unit operation within a series of other operations. This will depend upon the specific needs of the user.

It will also be readily appreciated that any number of pans can be incorporated into the system to progressively grow or accrete a granule. To this end, the process is interruptible and therefore can be custom designed to produce granules having a variety of layers of material to produce a host of valuable granules. It will be clear to those skilled in the art that the process is effective for producing a number of different forms of fertilizer and has particular utility with respect to the formation of high grade fertilizer for use on golf courses, etc.

To this end, the particles may include a compound having reduced solubility relative to the fertilizer in order to facilitate a timed release of the fertilizer. Examples of such material include sulfur reducing agents, nitrogen fixing compounds, urea, etc. The dissipation of the fertilizer could also be timed with the growth cycle of the material receiving the fertilizer or the requirement thereof.

In terms of the binder, suitable example include lignosol, sugars, saturated salts and proteins, water, calcium sulfate, sodium sulfate, potassium chloride, dry gluttens, wheat grains, barley grains, rice grains and calcium phosphate among others. The choice of the binder will depend on the desired characteristics of the granule and accordingly, the aforementioned examples are only exemplary.

With respect to the feedstock and binder, where the binder contains a higher moisture content, the use of an atomizer for dispensing moisture on to pans 28 and/or 30 may not be necessary. In a further variation, binder and feedstock material may be added to the pan(s) simultaneously. These process variations will be dependent upon the nature of the material to be pelletized or granulated.

Figure 2:
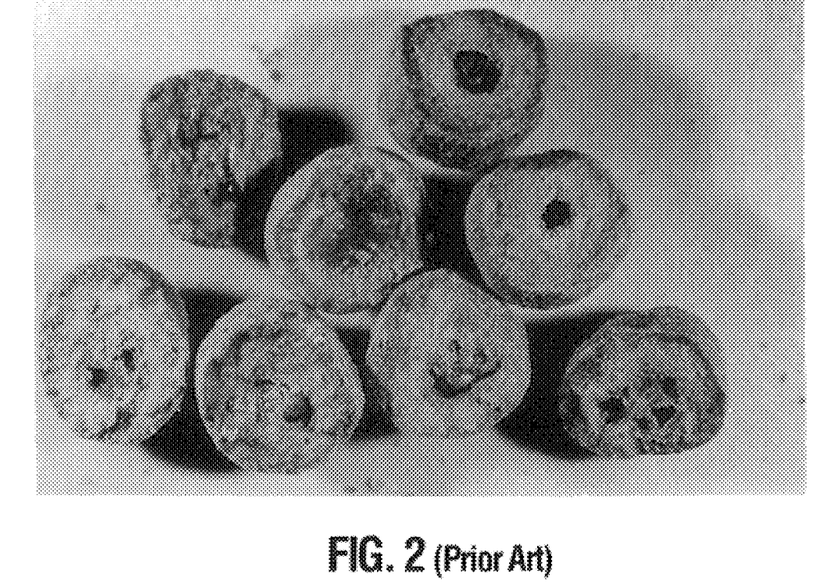
FIG. 2 is a photograph of a sulfur granule in cross-section formulated by practicing the prior art methodology.

Referring now to the photographs, FIG. 2 illustrates granulated sulfur pellets with an ammonium sulfate core created by the prior art technique as taught by Derdall et al. The pellets clearly include a sizeable core occupying a large amount of the volume of the particle. It is also evident that the cross-section of the particles is nonuniform and in some cases hollow in localized areas. In addition, the particles are not spherical, but rather substantially aspherical. These factors all depreciate the quality and industrial value of the particles.

Figure 3:
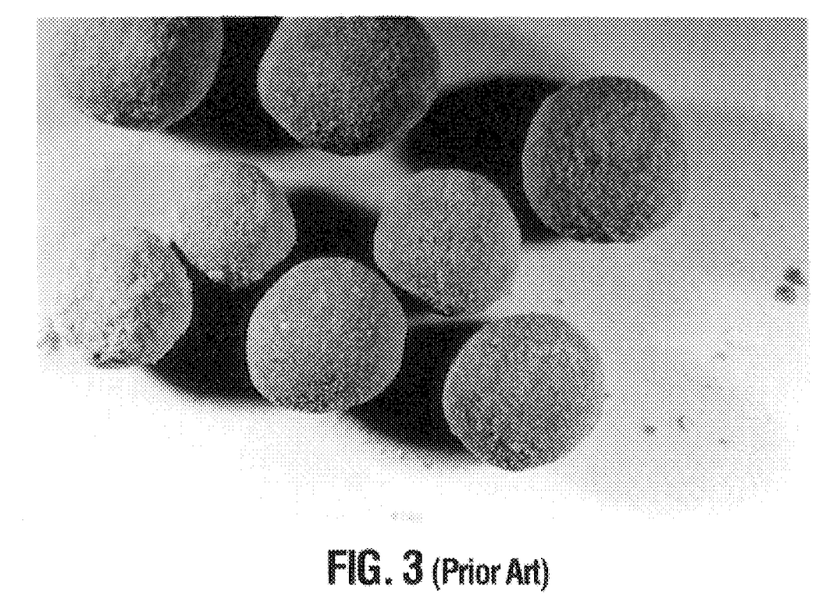
FIG. 3 is a photograph of the sulfur granule of FIG. 2.

FIG. 3 shows whole granulated sulfur pellets synthesized in accordance with the Derdall et al. methodology. As is evident from the figure, the exterior of the granules is loose to provide a grainy surface texture. This lack of consolidation of the material results in the generation of dust which, as indicated supra, creates significant handling problems and in particular, increases the likelihood of a potential explosion.

Figure 4:
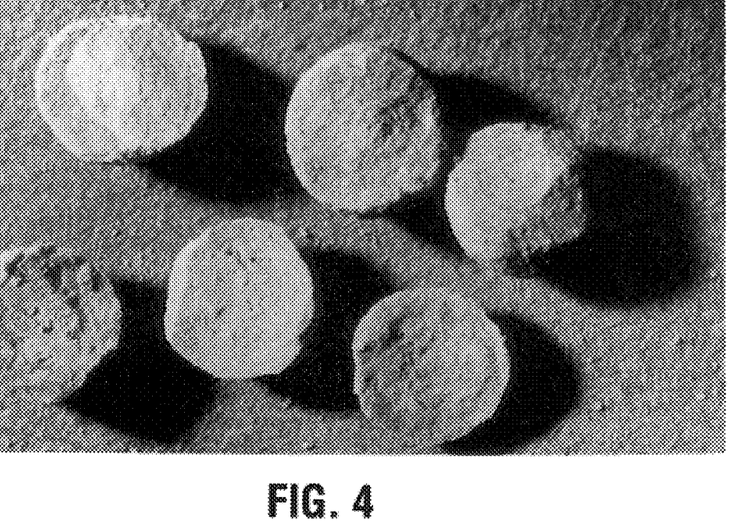
FIG. 4 is a photograph of sulfur granules in cross-section formulated by practicing the methodology of one embodiment the present invention.
Figure 5:
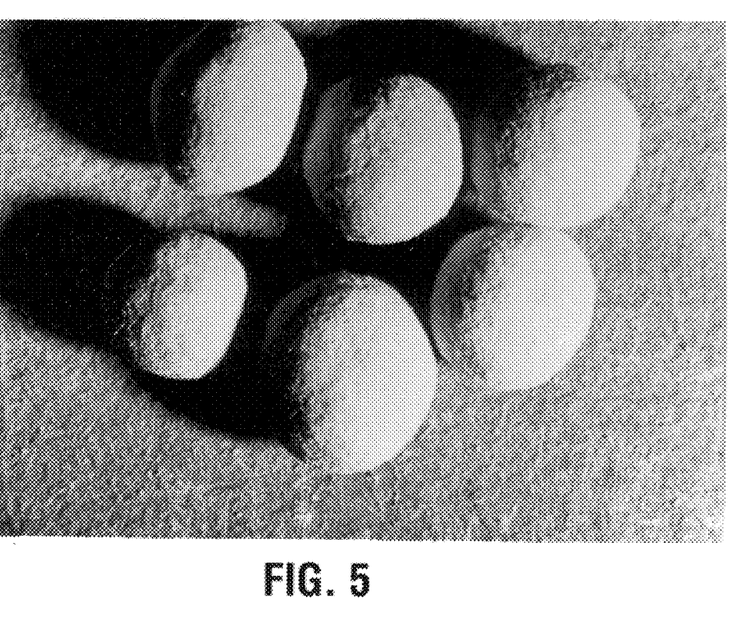
FIG. 5 is a photograph of the sulfur granules of FIG. 4.

In contrast to the above, FIGS. 4 and 5 demonstrate the high quality particles generated by the present methodology. Of particular significance is the fact that the particles/granules are completely devoid of any core or seed, but rather are entirely uniform, continuous and solid throughout. FIG. 5 illustrates the granules in toto. It is readily apparent that the granules have a different surface appearance than those formulated by the prior art; this is further evinced by the lack of dust or grains surrounding the particles. The particles are significantly more consolidated, harder, tightly packed and include a greater amount of feedstock than the prior art granules, 15–18% void space compared to 20 to 23% for prior art. Accordingly, the advantages enumerated herein previously are realized.

Figure 6:
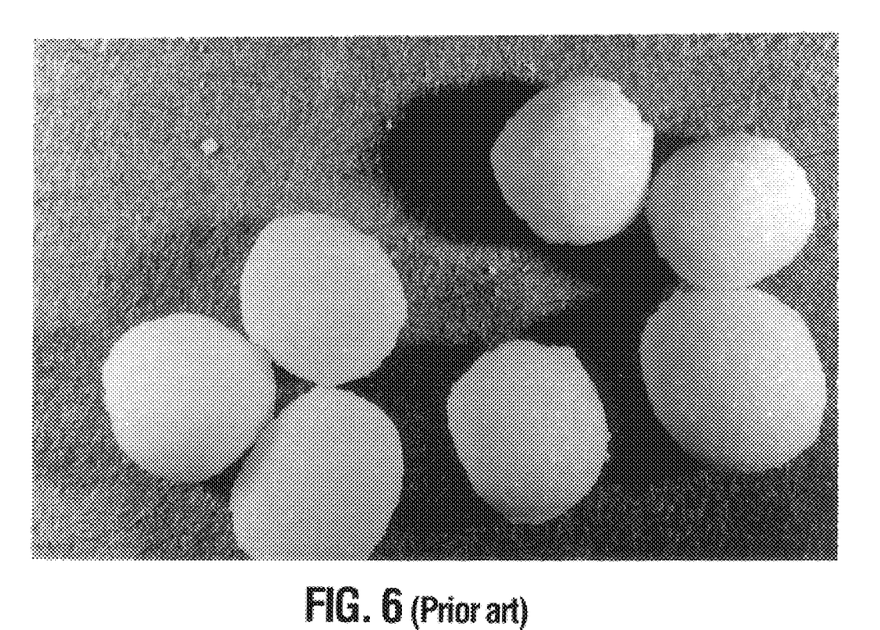
FIG. 6 is a photograph of a potassium chloride granules formulated by practicing the methodology of the prior art.
Figure 7:
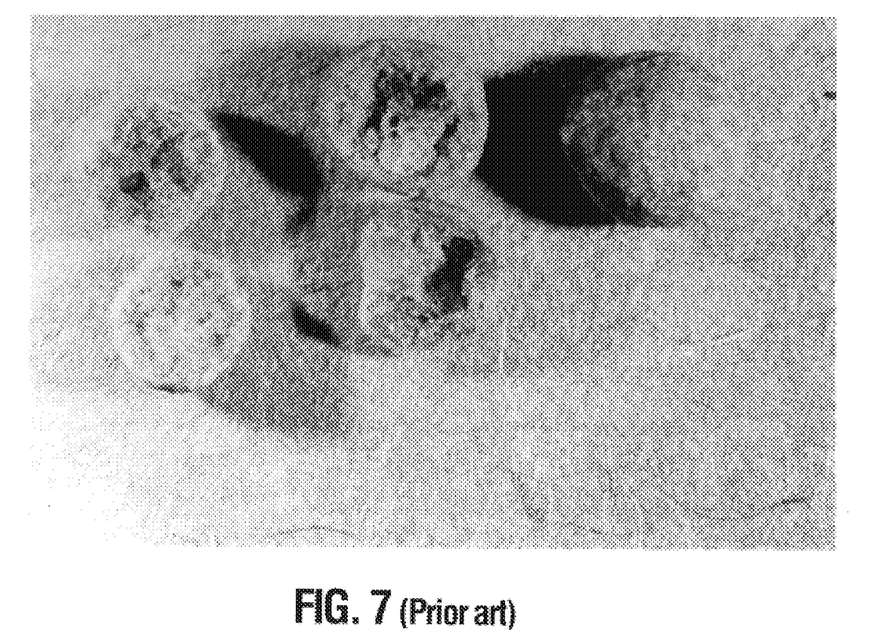
FIG. 7 is a photograph of red potassium chloride granules in cross-section formulated by practicing the prior art methodology.

In respect of FIGS. 6 and 7, shown are potassium chloride granules made by the technique set forth by Derdall et al. The Figures illustrate two different forms of the compound and confirm the presence of the seed indicated as a critical factor to the generation of the particles.

Figure 8:
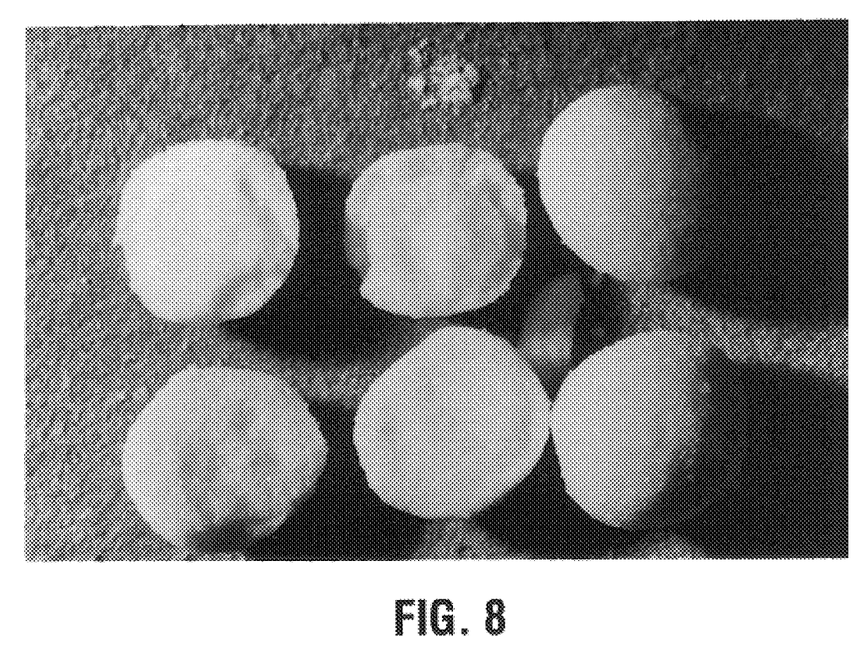
FIG. 8 is a photograph of potassium chloride granules in cross-section formulated by practicing the methodology of one embodiment of the present invention.
Figure 10:
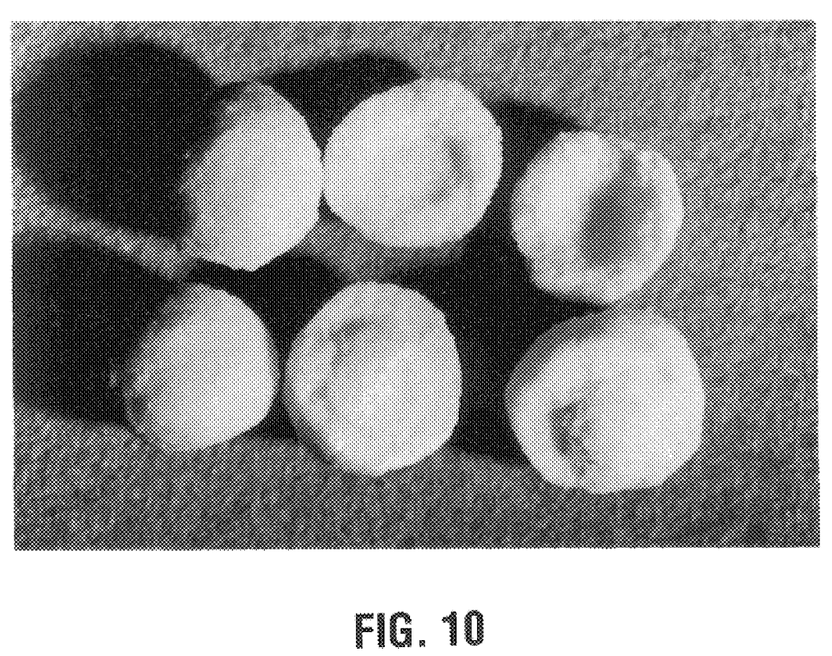
FIG. 10 is a photograph of potassium chloride granules containing sulfur and formulated by practicing the methodology of one embodiment of the present invention.

With reference to FIGS. 8 and 10, shown are potassium chloride particles formulated by practicing the methodology of one embodiment of the invention. As illustrated, the particles are substantially spherical, devoid any core and lack the surface graininess of the particles of FIG. 6. The particles illustrated include a sulfur compound.

Figure 9:
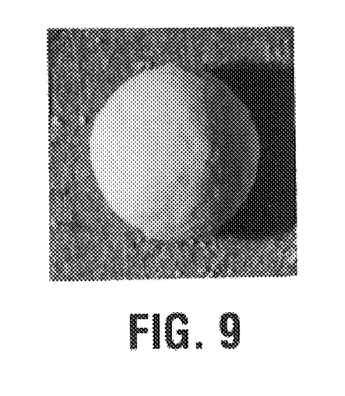
FIG. 9 is a photograph of a potassium chloride granule illustrated in FIG. 8.

FIG. 9 illustrates a sodium bicarbonate granule granulated by practicing the technology set forth herein. Noteworthy is the spherical appearance and consolidation of the particle.

The inventive technology established herein affords a commercially viable and industrially significant development in the granulation art affording pellet content customization among other features.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A granulated homogeneous fertilizer product containing feedstock powder in a size distribution of −200 mesh and a nucleating material in a size distribution of −35 mesh to +150 mesh said fertilizer product containing at least 95% by weight of said feedstock powder, and nucleating material and binder material to 100% by weight, said feedstock powder selected from the group consisting of potassium chloride, potassium sulfate, potassium nitrate, diammonium phosphate, monoammonium phosphate, ammonium sulfate, ammonium nitrate and urea.

2. The fertilizer product as set forth in claim 1, wherein said fertilizer product is augmented with an additive selected from the group consisting of at least one of copper, boron, encapsulated sulphur oxidizing bacteria, a herbicide, a pesticide, and a plant nutrient.

3. The fertilizer product as set forth in claim 1, wherein said fertilizer product comprises a time release fertilizer.

4. The fertilizer product as set forth in claim 1, wherein said fertilizer product comprises a substantially spherical granule.

* * * * *